Patented Dec. 31, 1929

1,741,336

UNITED STATES PATENT OFFICE

GEORGE W. PRESSELL, OF PHILADELPHIA, PENNSYLVANIA, ASSIGNOR TO E. F. HOUGHTON AND COMPANY, OF PHILADELPHIA, PENNSYLVANIA, A CORPORATION OF PENNSYLVANIA

CARBURIZING MATERIAL

No Drawing. Application filed July 14, 1928. Serial No. 292,915.

My invention relates to that class of compounds, known as carburizers or case-hardening materials, used to increase the carbon content of the surface of iron and steel objects whereby it is possible to obtain objects with a relatively hard surface.

One object of my invention is to provide a novel compound which is a departure from the usual type of material used in carburizing and case-hardening work.

Another object is to provide a relatively cheap carburizing material which can be economically manufactured and which at the same time will be of increased carburizing activity.

A further object is to provide a carburizing material not only with increased carburizing activity on the initial heat but one which will be substantially more permanent in its action and which can be used with success for repeated heats.

Another object is to furnish an improved process in the manufacture of carburizers and case-hardening materials. Other objects of the present invention will be apparent from a consideration of the specification and claims.

At the present time, carburizing compounds are manufactured in granular and pellet form of various meshes. In general, the carburizers comprise carbonaceous material and energizer. Various methods of manufacturing the grains and pellets are now in use. For example in the manufacture of one type of carburizing material, grains of coke or charcoal or both are treated with the energizing material which in turn is usually bound in the pores or on the surface of the carbonaceous grains by means of an organic binder. At times, charcoal dust is used as a drying agent to prevent the granules from caking together. Another type of carburizing material is that made from charcoal or coke dust mixed with the powdered energizer and thereafter formed into pills or pellets by admixing a binding material therewith. If desired, charcoal dust is added to the surface of the grains for the same purpose as in the manufacture of the other type of carburizing material.

The features of the present invention may be successfully employed with carburizers whose carbonaceous material either is initially in the form of grains or in the form of dust. The invention is characterized by the presence of a heavy metal oxide in and at the surface of the carburizing grains or pellets. The term "heavy metal oxide" includes the oxides of manganese, iron, chromium, aluminum, nickel, cobalt, lead, copper and the like, and excludes the oxides of the alkali and alkaline earth metals. In the choice of the oxides to be used according to this invention, the oxides with a high oxygen content are preferable. For example, if iron oxide is to be used, the ferric ($Fe_2O_3$) or ferrosoferric ($Fe_3O_4$) oxides are preferred; with nickel and cobalt, the oxides in which the metal is of the higher valence are more satisfactory. The same relation holds for the oxides of the other metals. I have found that the results obtained by the use of manganese dioxide are especially satisfactory and in the sample of a suitable carburizer employing this invention hereinafter discussed, one employing manganese dioxide is given but it is to be understood that other heavy metal oxides may be used in the manner illustrated.

The effect of the presence of the heavy metal oxide in and at the surface of the carburizing material is not definitely understood but due to the increased carburizing activity both in the initial and in subsequent runs, it is thought that the oxygen is liberated from the oxide under the conditions of carburization. It is well known that under certain conditions, carbon monoxide is evolved in the carburizing pot. This is disadvantageous for according to the present theories, it is carbon dioxide that gives its carbon to the steel. By employing the heavy metal oxide in and at the surface of the carburizer, the presence of the necessary carbon dioxide is assured since it is probable that any carbon monoxide is converted to the dioxide by the presence of the oxygen of the heavy metal oxide. Oxygen from the air is absorbed by the reduced oxide or metal after the carburizing heat and therefore the carburizer is ready for subsequent use.

This theoretical discussion is merely to be considered as a possible explanation of the phenomenon encountered and is not to be considered in any way limiting the invention involved.

Besides insuring the availability of oxygen during carburization, the heavy metal oxide performs a second important function in those carburizers whose compounding or manufacture involves the use of binding materials. The heavy metal oxide is highly absorptive and acts most satisfactorily as a drying or dusting agent. The use of this prevents the individual grains of the carburizer from sticking together and settling down into a solid cake during storage or transit. The relatively high density of the oxides precludes the possibility of contamination of the air in the mixing room. This property, as well as the high water-absorptive power of the oxides, and the availability of the oxygen during carburization result in a carburizing material of much improved qualities and carburizing activity.

If the carburizer is one of the type employing an organic binder, it is often desirable to coat the individual grains with an intermediate dusting or drying agent after the addition of the agglutinant and prior to the addition of the heavy metal oxide. In such cases, I have found that infusorial earth is particularly advantageous. The addition of the intermediate drying material, that is to say the infusorial earth or the like, also constitutes part of the present invention. In place of the infusorial earth, other inert or relatively inert materials such as silica flour or cement may be used or, if desired, a material with carburizing value such as magnesium carbonate, limestone or barium carbonate. The choice of the so-called intermediate drying agent will depend upon the use for which the compound is to be employed but for general purposes the infusorial earth is satisfactory. Any substance which is non-hygroscopic and which is capable of drying the grains may be used. Hereinafter, throughout the specification and claims, this material is referred to as "an intermediate drying agent".

The use of the intermediate drying agent is optional and the dusting of the grains and the prevention of the caking may be had entirely by the use of the heavy metal oxide, for example, manganese dioxide. The following process may be employed: A layer of No. 3 mesh charcoal is placed in the hopper of a mixer of suitable construction and then a layer of barium carbonate is superimposed thereon followed by a second layer of charcoal. The addition of the alternate layers of the charcoal and barium carbonate is continued until 258 pounds of No. 3 mesh charcoal and 103 pounds of barium carbonate have been added. Following this, 24 pounds of hydrated lime are placed in the hopper. 168 pounds of No. 3 mesh rice coke and a gallon of water are thoroughly agitated in the revolving mixer and the entire contents of the hopper are dumped therein. The mixing is continued until a uniform distribution of all the materials is obtained. Then 8½ gallons of black strap molasses or other suitable binder are permitted to flow very slowly into the mass. After the addition of this material, the mixing is continued for a suitable length of time until the grains are coated with the molasses. In most cases, a period of four minutes is sufficient after the 8½ gallons of black strap molasses have been added. In a specific case, 45 pounds of manganese dioxide are added to the concrete mixer and the mixing continued until the manganese dioxide has had an opportunity to counteract the adhesive nature of the binder and completely coat the individual grains. This requires a relatively short time, and in general practice in four or five minutes the grains will be completely coated with the heavy metal oxide.

From this process, it will be seen that the heavy metal oxide forms a coating on the outside of the individual carburizing grains and it is the presence of this manganese dioxide or other heavy metal oxide in and at the surface of the grains which accounts for the satisfactory and unexpected results obtained by the use of the carburizer of this invention. The example given above is merely illustrative of one satisfactory carburizer in which the heavy metal oxide is found in and at the surface of the individual particles, and the carbonaceous material, the energizer, the organic binder and the heavy metal oxide as well as the amounts thereof may depart widely from the specific formula of the example.

As hereinbefore pointed out, at times it is desirable to use an intermediate drying material such as infusorial earth, silica or one of the carbonates. If such is advantageous, then the compound, say the infusorial earth, may be added to the mixture following the incorporation of the black strap molasses and prior to the addition of the heavy metal oxide. In the case of infusorial earth, I have found that 15 pounds is a satisfactory amount on the basis of the carbonaceous material, energizer and binder given above, and the use of this 15 pounds of infusorial earth cuts down the amount of manganese dioxide necessary in the above example from 45 pounds to 30 pounds. In the use of infusorial earth, it is added to the mixer after the agitation with black strap molasses or other binder and the mixing is continued until it dusts or dries the grains and at least partly coats the individual grains. This usually takes about two minutes. The manganese dioxide is then added and the agitation and mixing continued until the grains are completely covered with the manganese dioxide.

I have found that manganese dioxide is particularly advantageous since it comparatively freely gives up its oxygen during the carburizing operation and thereafter re-absorbs oxygen from the air. Furthermore, it is non-hygroscopic and therefore is an excellent drying agent. It has the further advantage of being of a dark color and of fairly heavy density so that there is very little tendency for the material to contaminate the air in the mixing. The color makes the carburizer very acceptable to the trade.

Obviously also, the product containing the essential ingredients of carburizer as herein outlined may be obtained by other processes and the invention is not to be limited to any particular process of manufacture nor is there any limitation in the proportions of the substances employed in the product since the proportions may be largely varied to suit the particular work for which the carburizer is intended.

I claim:

1. Granular carburizing material characterized by the presence of a coating of heavy metal oxide on the surface of the individual carburizing grains.

2. Granular carburizing material characterized by the presence of a coating of manganese dioxide on the surface of the individual carburizing grains.

3. Granular carburizing material comprising carbonaceous material, an energizer in intimate contact therewith and retained in contact by a binding material, and a coating of heavy metal oxide on the surface of the individual carburizing grains.

4. Granular carburizing material comprising carbonaceous material, an energizer in intimate contact therewith and retained in contact by a binding material and coating of manganese dioxide on the surface of the individual carburizing grains.

5. Granular carburizing material characterized by the presence of an intermediate drying agent on the surface of the individual carburizing grains and a superposed coating of a heavy metal oxide thereon.

6. Granular carburizing material characterized by the presence of infusorial earth on the surface of the individual carburizing grains and a superposed coating of manganese dioxide.

7. Granular carburizing material comprising carbonaceous material, an energizer in intimate contact therewith and retained in contact by a binding material, infusorial earth thereon and a superposed coating of manganese dioxide on the surface of the individual carburizing grains.

8. Granular carburizing material comprising charcoal and coke grains, barium carbonate and hydrated lime in contact therewith and thus retained by blackstrap molasses, an intermediate drying agent thereon of infusorial earth, and a coating of manganese dioxide in and at the surface of the individual grains.

GEORGE W. PRESSELL.